US008089836B1

(12) United States Patent
Painter et al.

(10) Patent No.: US 8,089,836 B1
(45) Date of Patent: Jan. 3, 2012

(54) DIFFERENTIAL PHASE DETECTOR

(75) Inventors: Christopher Painter, Longmont, CO (US); Jin Xie, Longmont, CO (US)

(73) Assignee: Marvell International Ltd. (BM)

( * ) Notice: Subject to any disclaimer, the term of this patent is extended or adjusted under 35 U.S.C. 154(b) by 239 days.

(21) Appl. No.: 12/436,291

(22) Filed: May 6, 2009

Related U.S. Application Data

(63) Continuation of application No. 12/168,594, filed on Jul. 7, 2008.

(60) Provisional application No. 60/948,068, filed on Jul. 5, 2007.

(51) Int. Cl.
    *G11B 5/09* (2006.01)
(52) U.S. Cl. ........... 369/47.15; 369/124.01; 369/124.15; 369/124.1
(58) Field of Classification Search .................. None
    See application file for complete search history.

(56) References Cited

U.S. PATENT DOCUMENTS

| 6,052,349 A | 4/2000 | Okamoto |
| 6,449,110 B1 | 9/2002 | DeGroat et al. |
| 6,608,871 B2 * | 8/2003 | Popplewell et al. ........... 375/316 |
| 6,944,105 B2 | 9/2005 | Wakabayashi et al. |
| 7,012,875 B2 * | 3/2006 | Shimano et al. ........... 369/112.02 |
| 2009/0245448 A1 * | 10/2009 | Ran et al. ................... 375/373 |

OTHER PUBLICATIONS

Braat, J., "Differential time detection for radial tracking of optical disks," Applied Optics, vol. 37, No. 29, Oct. 10, 1998, pp. 6973-6982.
Pending patent application U.S. Appl. No. 11/518,115, filed Sep. 8, 2006, 38 pages.
Joseph Braat et al., "Diffractive read-out of optical discs", 2002, pp. 1-43.

* cited by examiner

*Primary Examiner* — Muhammad N Edun

(57) ABSTRACT

A phase detector comprises a first slicing circuit that generates a first digital signal corresponding to a logic state of a first generally continuous signal. A second slicing circuit generates a second digital signal corresponding to a logical state of a second generally continuous signal. Phase detector logic compares triggering edges of the first and second digital signals to generate a phase difference signal having a pulse width corresponding to a phase difference between the first and second generally continuous signals. Aberration compensation circuitry is in communication with the phase detector logic to ensure generation of the phase difference signal in the presence of signal aberrations occurring at the triggering edges of the first and second digital signals.

21 Claims, 19 Drawing Sheets

DIFFERENTIAL PHASE DETECTOR

CROSS-REFERENCE TO RELATED APPLICATION

This application claims the benefit of priority under 35 U.S.C §119(e) to U.S. Provisional Application No. 60/948,068, filed Jul. 5, 2007, and is a continuation of Ser. No. 12/168,594, filed Jul. 7, 2008, both of which are hereby incorporated by reference.

BACKGROUND

Optical storage systems are used in a wide range of applications. Such optical storage systems employ optical media (i.e., CDs, DVD discs, Blue Ray discs, HD discs, and other media) that stores data along tracks disposed radially about the disc-shaped media. The data may be in the form of reflective pits disposed in the media. The reflective pits are detected/written by optical read/write components that are moved radially to different tracks of the storage media.

Differential phase detection may be used during the reading of data from optical storage media. The differential phase detection generates a radial error signal that drives a radial control loop to properly align the optical read components with the track that is to be read. The differential phase detection signal may also be used when moving to a new radial location on the storage media (i.e., seeking). During such an operation, the differential phase detection signal may be post processed, along with other information, by a circuit known as a track counter. The track counter facilitates monitoring of the gross radial position of the optical read components.

A differential phase detector may use a photodetector array to determine whether the optical read components are aligned with the desired track. The photodetector array is used to measure a time-varying diffraction pattern. The physical dimensions of the features on the disc are comparable to the wavelength of the light used to read the data, and the photodetector array that processes the light reflected from the disc is illuminated by a diffraction pattern. The characteristics of this diffraction pattern are influenced by the radial position, and by the particular pattern of recorded data. When an objective lens of the optical read components is in alignment with a track centerline, the electrical signals generated by the elements of the photodetector are in phase. When there is a radial position error, however, the diffraction pattern rotates about the optical axis as a particular data bit is scanned.

The electrical signals provided by the photodetector array are communicated to a signal processing circuit. The signal processing circuit may include a phase detector that compares the phase relationship of the electrical signals. The phase relationship is used to generate the track error signal.

As the data density of optical media storage increases, detection of electrical signals from the photodetectors becomes more difficult. As a result, detection circuits for such high-density media may become more complicated and costly to implement. Further, phase detectors used in the signal processing circuitry may be subject to noise signals that inhibit the proper detection of the phase relationship of the electrical signals. This may result in corresponding errors in the radial error signal.

SUMMARY

The present invention is defined by the following claims, and nothing in this section should be taken as a limitation on those claims. By way of introduction, the preferred embodiments described below provide a phase detector. In one preferred embodiment, the phase detector comprises a first slicing circuit that generates a first digital signal corresponding to a logic state of a first generally continuous signal. A second slicing circuit generates a second digital signal corresponding to a logical state of a second generally continuous signal. Phase detector logic compares triggering edges of the first and second digital signals to generate a phase difference signal having a pulse width corresponding to a phase difference between the first and second generally continuous signals. Aberration compensation circuitry is in communication with the phase detector logic to ensure generation of the phase difference signal in the presence of signal aberrations occurring at the triggering edges of the first and second digital signals.

Other preferred embodiments are provided, and each of the preferred embodiments described herein can be used alone or in combination with one another.

The preferred embodiments will now be described with reference to the attached drawings.

DETAILED DESCRIPTION

Figure 1:
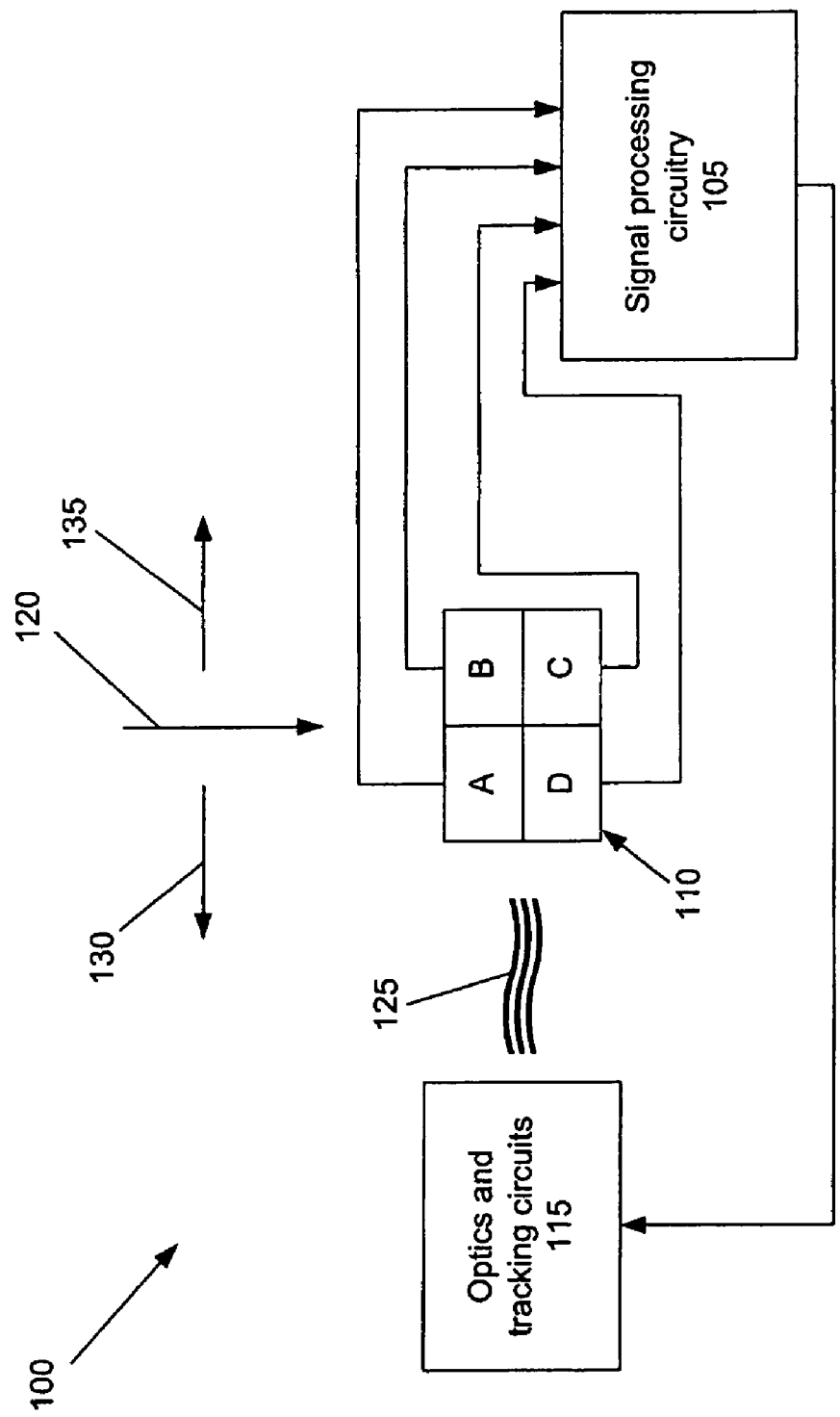
FIG. 1 is a block diagram of a system used to read an optical storage disk.

FIG. 1 is a block diagram of a system 100 used to read an optical storage disk. System 100 includes signal processing circuitry 105 in communication with electrical signals provided by a photodetector array 110. The signal processing circuitry 105 includes equalization circuitry that increases the sensitivity of the system 100 to low-amplitude, high-frequency electrical signals that are characteristic of high data density optical discs. Further, the signal processing circuitry 105 includes phase detection circuits that have substantial immunity to noise signals.

In system 100, optics and tracking circuits 115 are used to read data from a track of the optical disc as the optics and tracking circuits 115 move in alignment with a track in the direction shown by arrow 120. Optical signals 125 indicative of any radial error are communicated for detection by the photodetector array 110. Although other photodetector arrangements may be used, system 100 uses a four-quadrant photodetector array having a photodetector A, B, C, and D, arranged in each quadrant of a plane.

Optical signals 125 indicate when optics and tracking circuits 115 are out of alignment with track 120. When out of alignment, the optical signals introduce a delay between the electrical signals produced by elements A and B, and a similar delay between the electrical signals from elements C and D. Since these delays correspond to the amount of radial displacement, they may be used to generate a radial error signal. In FIG. 1, radial errors in the direction of arrow 130 cause the signals generated by photodetectors A and D to lead the signals generated by photodetectors B and C. Similarly, radial errors in the direction of arrow 135 cause signals generated by photodetectors B and C to lead the signals generated by photodetectors A and D.

Although other differential phase detection methods may be used, system 100 uses DTD4 (Differential Time Detection, Type 4). In a DTD4 structure, the radial error signal RE is calculated by passing the sum of the measured delays τ(A,B) and τ(C,D) through a lowpass filter. That is, the radial error is $$RE = LPF[\tau(A,B) + \tau(C,D)]$$

where τ(x,y) represents the normalized delay between the signals x and y, and LPF represents a lowpass filtering operation. The measured delays may be normalized to the data rate of the readback signal, and therefore to the rotational rate of the disc. Consequently, the scaling of the radial error signal is invariant with respect to the rotational rate of the disc.

Figure 2:
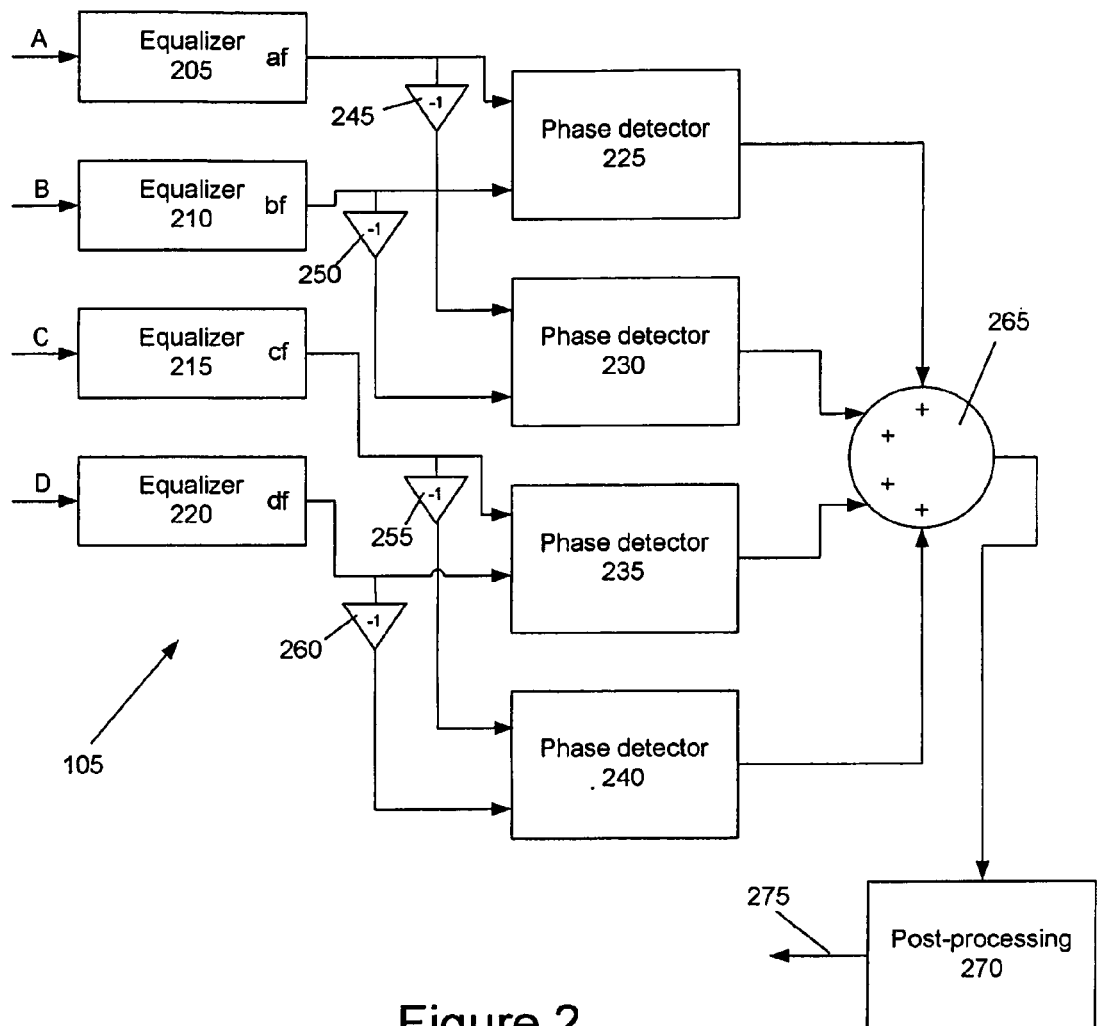
FIG. 2 is a block diagram of one embodiment of a signal processing circuit that may be used in the system shown in FIG. 1.

FIG. 2 is a block diagram of one embodiment of the signal processing circuitry 105 shown in FIG. 1. As shown, the electrical signals from photodetectors A through D are communicated to respective equalizers 205 through 220. Equalizers 205 through 220 may each be constructed in the same fashion. Consequently, the phase relationships of output signals af through df are maintained so that they correspond to the phase relationships of the input signals A through D.

The output signals af through df, and their inverted counterparts, are provided as input signals to a plurality of phase detectors 225 through 240. Phase detector 225 is in communication with signals af and bf of equalizer 205 and 210, respectively. Phase detector 230 is in communication with signals af and bf of equalizer 205 and 210 through inverters 245 and 250, respectively. Phase detector 235 is in communication with signals cf and df of equalizer 215 and 220, respectively. Phase detector 240 is in communication with signals cf and df of equalizer 215 and 220 through inverters 255 and 260, respectively.

In this configuration, the phase detectors 225 through 240 measure different phase relationships between output signals af through df. Phase detector 225 measures the phase relationship between the rising edge of signal af and the rising edge of signal bf. Phase detector 230 measures the phase relationship between the falling edge of signal af and the falling edge of signal bf. Phase detector 235 measures the phase relationship between the rising edge of signal cf and the rising edge of signal df. Phase detector 240 measures the phase relationship between the falling edge of signal cf and the falling edge of signal df.

The output of the phase detectors 225 through 240 are provided to the input of a summing circuit 265. The resulting summation signal is provided to the input of post-processing circuitry 270 to generate a radial error signal 275. The post-processing circuitry 270 may include one or more filters to low-pass filter the summation signal provided by summation circuitry 265.

Figure 3:
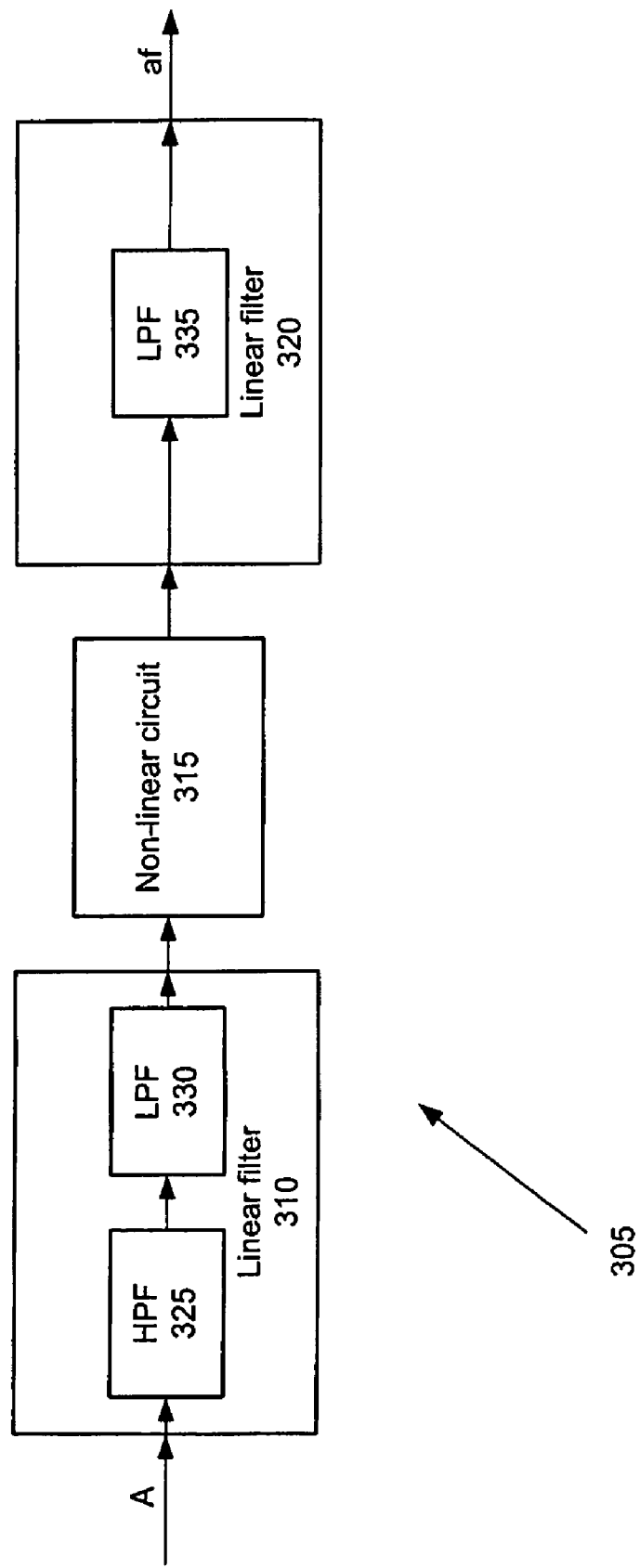
FIG. 3 shows one embodiment of an equalizer that may be used in the signal processing circuit shown in FIG. 2.

FIG. 3 illustrates one embodiment of an equalizer 305 that may be used to implement the equalizers 205 through 220 shown in FIG. 2. In order to increase the sensitivity of the signal processing circuitry 105 to the high data signal rates and/or high data densities associated with high density optical storage disks, equalizer 305 includes a non-linear circuit that, for example, may be memoryless.

In the embodiment shown in FIG. 3, equalizer 305 includes a linear filter 310 that is in communication with one of the electrical signals from photodetectors A through D. The output of linear filter 310 is provided to the input of a non-linear circuit 315. The output of non-linear circuit 315, in turn, is provided to the input of another linear filter 320. The output of linear filter 320 corresponds to one of the output signals of through df shown in FIG. 2.

Linear filter 310 includes a cascade arrangement of a high pass filter 325 followed by a low pass filter 330. High pass filter 325 assists in eliminating residual DC offset or low-frequency excursions of the electrical signals provided by photodetectors A through D thereby ensuring correct detection of zero crossings for the signals in subsequent processing. High pass filter 325 may have double real poles at $-1/(k_1 T)$ Hz, where T corresponds to the bit interval of a readback signal for the optical storage medium that is read, and where $k_1$ corresponds to a constant that is chosen depending on the disk format of the optical storage medium. The value for $k_1$ may be approximately 8 for a standard definition DVD format, and about 5 for a high-definition disk format. More particularly, the high pass filter 325 may have a transfer function corresponding to the following:

$$H(s) = s^2/(s+(2\pi/k_1 T))^2.$$

Low pass filter 330 may have two real poles at $-1/(k_2 T)$ Hz, where T corresponds to the bit interval of the readback signal for the optical storage medium that is read, and where $k_2$ corresponds to a constant that is chosen depending on the disk format of the optical storage medium. The value for $k_2$ may be approximately 4 for a standard definition DVD format, and about 3 for a high-definition disk format. More particularly, the low pass filter 330 may have a transfer function corresponding to the following:

$$H(s) = \frac{1}{\left[s\frac{k_2 T}{2\pi} + 1\right]^2}.$$

Filter 330 assists in attenuating high-frequency noise that might otherwise decrease the reliability of delay measurements.

The non-linear circuit 315 that follows the low pass filter 330 may be memoryless and implemented as an analog comparator (slicer). Such a circuit is characterized by a very high gain near its switching threshold, and sharply defined positive and negative saturation levels. When the signal provided by lowpass filter 330 to the non-linear circuit 315 is slightly greater than a predefined threshold voltage, the output signal of non-linear circuit 315 saturates at a voltage that is positive with respect to the datum (zero level) of the overall nonlinear equalizer circuit. When the input signal provided by lowpass filter 330 to the non-linear circuit 315 is slightly negative with respect to this threshold voltage, the output signal of the non-linear circuit 315 saturates at a level that is negative with the respect to the datum.

Figure 4:
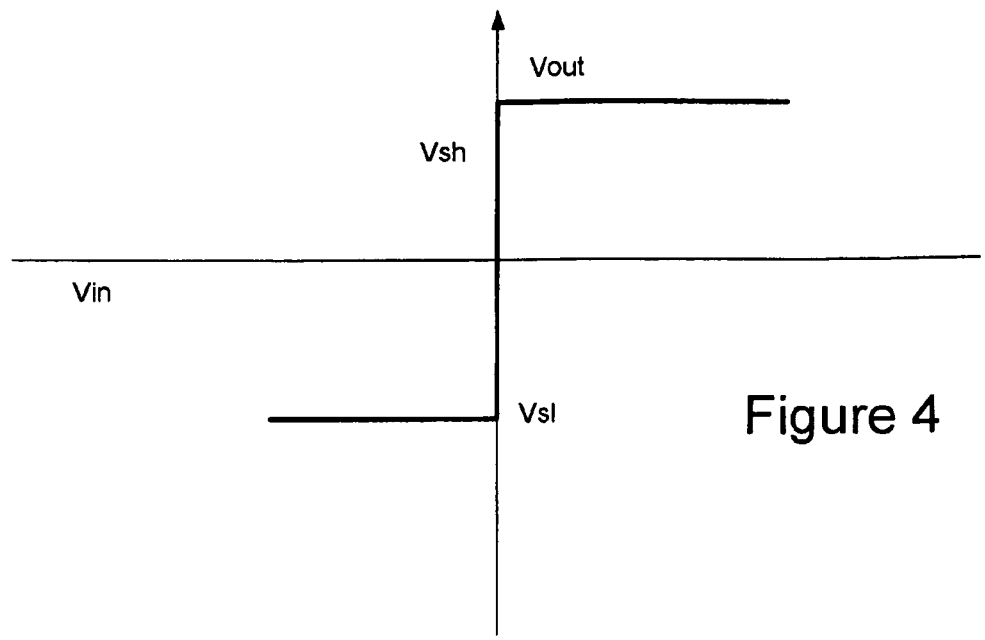
FIG. 4 shows an exemplary transfer characteristic that may be associated with a non-linear circuit.
Figure 5:
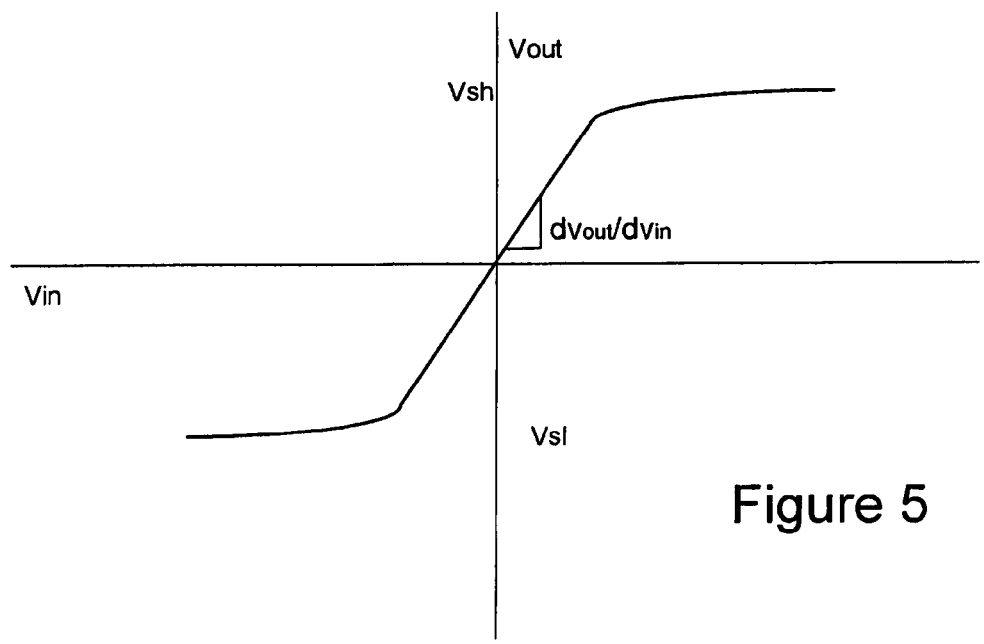
FIG. 5 shows another exemplary transfer characteristic that may be associated with a non-linear circuit.

FIGS. 4 and 5 show exemplary transfer characteristics that may be associated with the non-linear circuit 315. FIG. 4 shows an ideal slicer characteristic where the output voltage Vout of the slicer transitions to a high voltage saturation level Vsh when the voltage input Vin goes above zero. Similarly, the output voltage Vout of the slicer transitions to a low voltage saturation level Vsl when the voltage input Vin falls below zero.

FIG. 5 shows a further transfer characteristic that may be associated with non-linear circuit 315. In FIG. 5, the transfer characteristic has a large slope, dvout/dvin, proximate the origin and reaches a high saturation voltage Vsh when the input voltage Vin is proximate a first threshold. The output voltage Vout reaches a low saturation voltage Vsl when the input voltage Vin is proximate a second threshold. The slope, dvout/dvin, may be about 4. Overall, the transfer characteristic shown in FIG. 5 has a sigmoid shape with soft knee breaks at the output saturation voltages.

Linear filter 320 includes a low pass filter 335 that is in communication with the output signal from the non-linear circuit 315. The low pass filter may have a single real pole at $-1/(k_3 T)$ where T corresponds to the bit interval of the readback signal for the optical storage medium that is read, and where $k_3$ corresponds to a constant that is chosen depending on the disk format of the optical storage medium. The value for $k_3$ may be approximately 4 for a standard definition DVD format, and about 3 for a high-definition disk format. More particularly, the low pass filter 335 may have a transfer function corresponding to the following:

$$H(s) = \frac{1}{s\frac{k_3 T}{2\pi} + 1}$$

Figure 6:
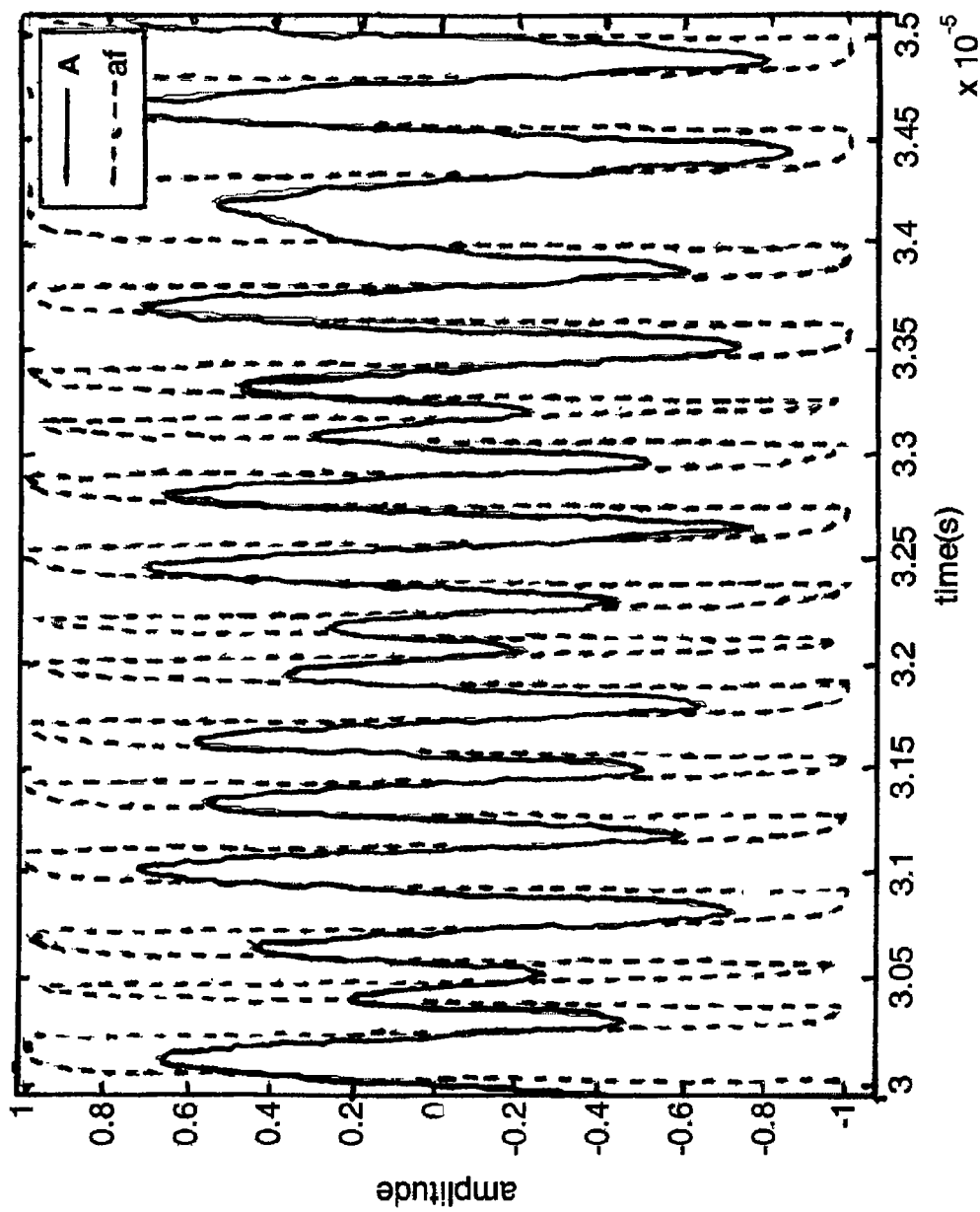
FIG. 6 is a graph that compares an input signal of the equalizer shown in FIG. 3 with its corresponding output signal.

The non-linear circuit 350 and low pass filter 335 act together to boost the amplitude of short duration pulses associated with certain optical disk formats and readers. This operation is shown in FIG. 6 which compares input signal A and output signal af of equalizer 305 to one another.

Figure 7:
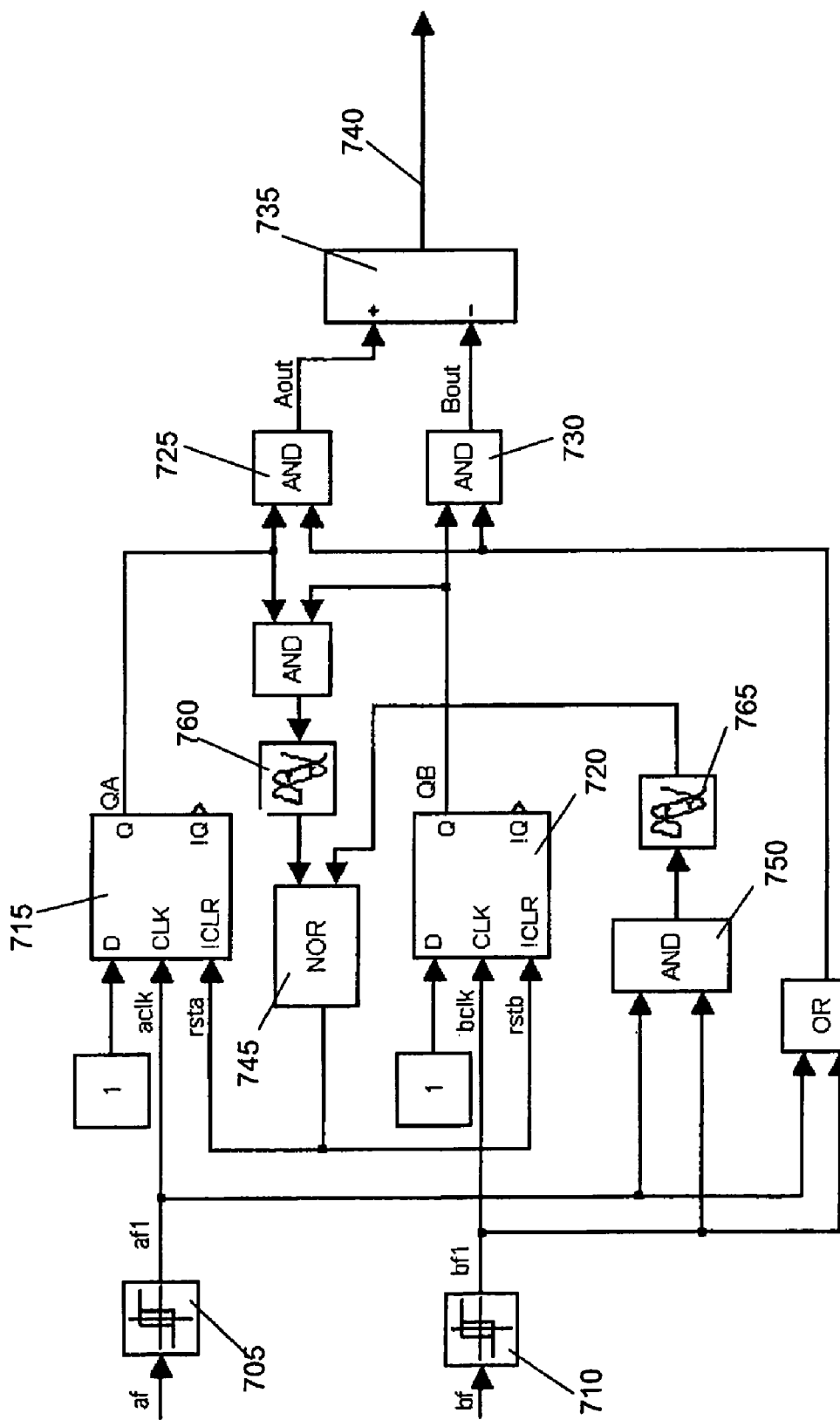
FIG. 7 is a block diagram of a first embodiment of a phase detector.

As noted, the output signals from the equalizers 205 through 220 are provided to the inputs of phase detectors 225 through 240 to provide signals corresponding to the phase differences between various combinations of signals af through df. FIG. 7 shows one embodiment of a phase detector 700 that may be used in phase detectors 225 through 240. Although the phase detector 700 shown in FIG. 7 is used to compare the phase difference between the rising edge of signal af and the rising edge of signal bf, the same phase detection circuitry may be used to compare the phase difference between any two signals.

As shown, signal af is provided to slicer 705 to generate output signal afl while signal bf is provided to slicer 710 to generate output signal bfl. Signals afl and bfl are provided to the clock inputs of flip-flops 715 and 720, respectively. The output signals QA and QB provided by 715 and 720 correspond to the phase difference between signals afl and bfl and are in communication with the inputs of AND gates 725 and 730 to generate phase signals Aout and Bout. Phase signals Aout and Bout are provided to a summation circuit 735 to provide a difference signal at output 740.

Phase detector 700 also includes other components that remove the "memory" capability associated with typical phase/frequency detectors. By removing this "memory" capability, the frequency detection associated with typical phase/frequency detectors is effectively removed. This allows the phase detector 700 to provide a correct indication of phase difference even when an aberration is present in one of the signals af, bf. The circuitry used to remove the "memory" capability may include NOR gate 745, AND gate 750, OR gate 755, and the corresponding delay lines 760 and 765.

An aberration in a signal corresponds to a deviation from an expected shape of the signal. For example, an aberration in a signal can be a high signal during a time in which a low signal is expected or vice versa. An aberration in a signal can come from various sources, such as, for example, a noise glitch (i.e., a false or spurious signal caused by a brief unwanted surge of power), coupling between clock or pulse signals of the phase detection circuit, and/or ground bouncing.

Figure 8:
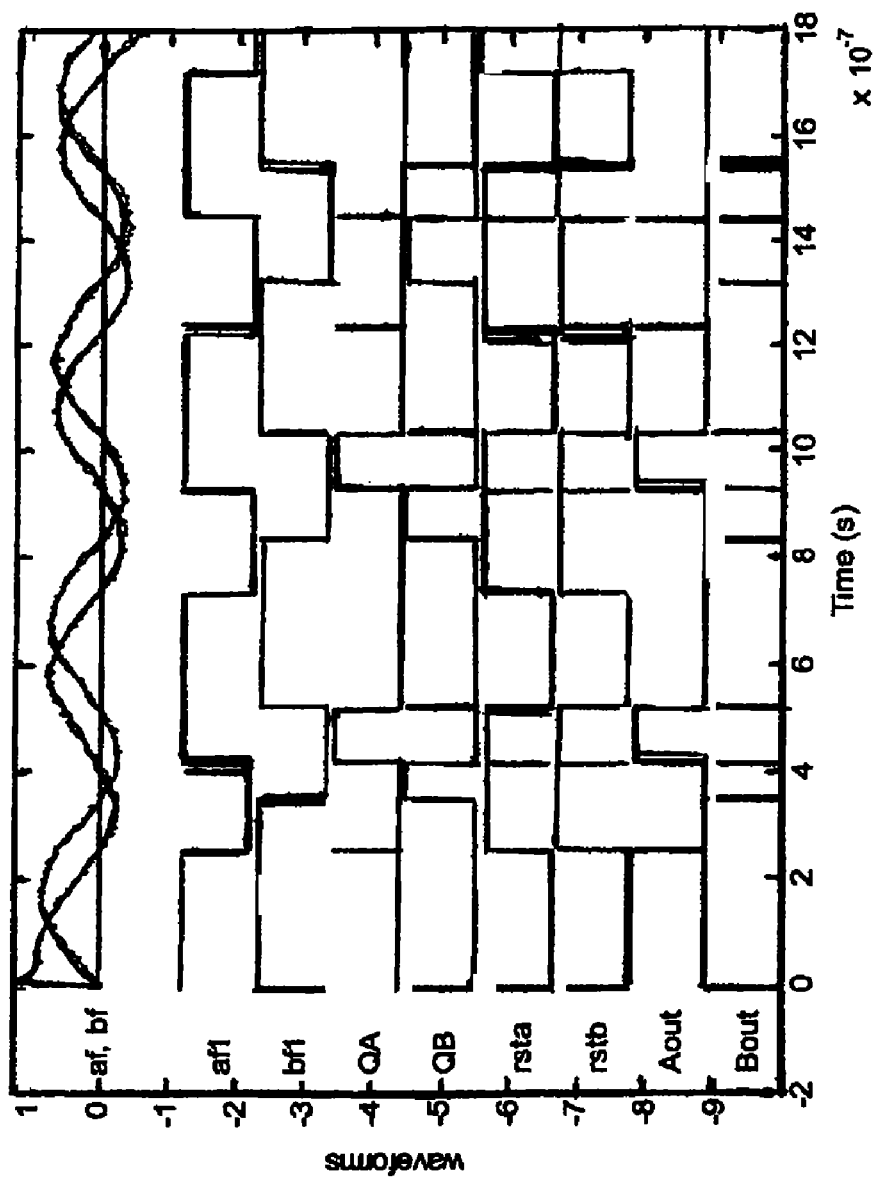
FIG. 8 is a timing diagram showing the signals used in the phase detector of FIG. 7.

A timing diagram showing the various signals of the phase detector 700 is shown in FIG. 8. Multiple phase detection cycles are shown in which a phase comparison between the rising edges (or falling edges depending on the desired phase detection operation) of two signals is executed. Signal Aout corresponds to the amount by which the leading edge of signal afl leads the leading edge of signal bfl. The spikes shown in signal Bout are of relatively short duration and do not have a substantial influence on the ultimate measurement of the phase difference between afl and bfl.

Figure 9:
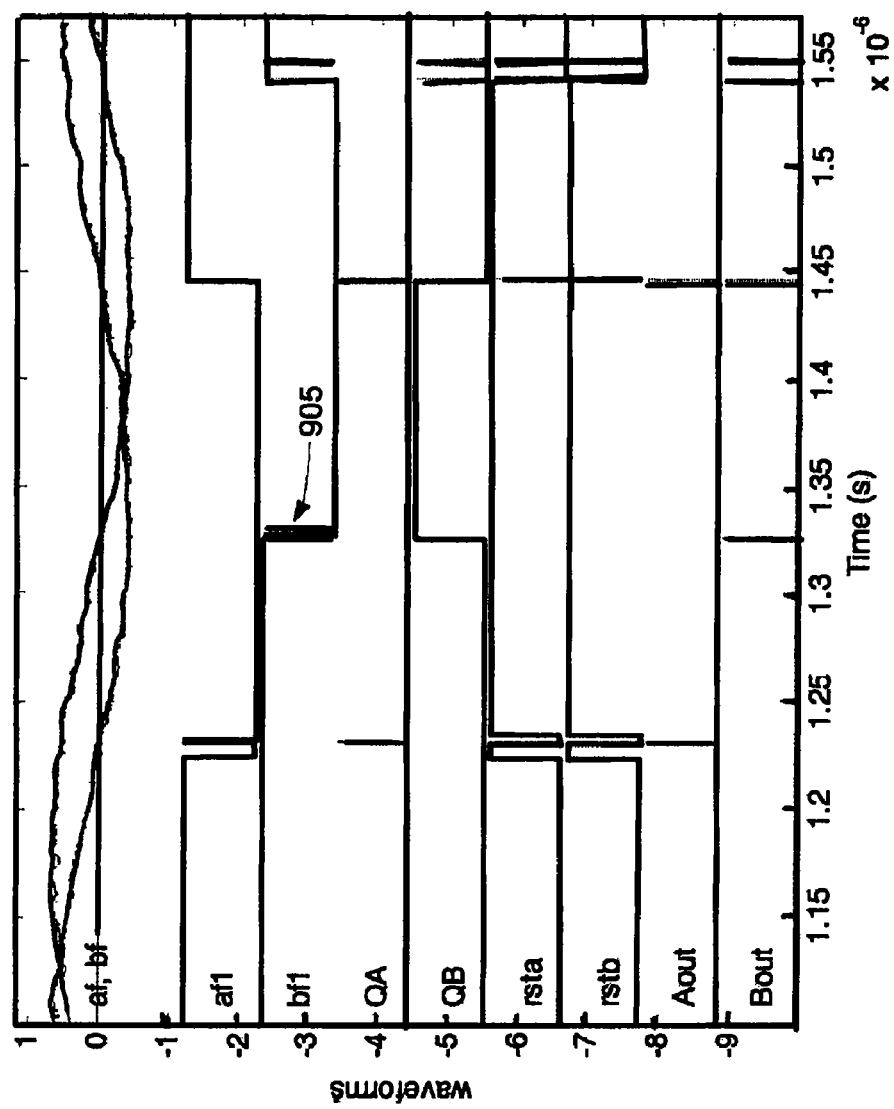
FIG. 9 is a further timing diagram showing the signals used in the phase detector of FIG. 7.

Although the phase detector 700 provides substantial immunity to aberrations in the phase detector signals, it may be sensitive to aberrations occurring during a falling edge of one or more of the input signals. The response of the phase detector 700 to an aberration 905 at a falling edge of signal bfl is shown in FIG. 9. In FIG. 9, there should be a positive going pulse in Aout during the time interval from 1.445 µs to 1.545 µs. However, the pulse is missing. This is due to the following:

At about 1.33 µs, signal bfl has a falling edge that is followed by a noise spike. The rising edge of the noise spike triggers flip-flop 720 so that signal QB goes to a positive state.

Signal QA is not asserted at this time, and afl and bfl are low. Consequently, the reset signals rsta and rstb are high thereby allowing signal QB to remain in a positive state.

At about 1.44 µs, afl has a rising edge. This edge triggers flip-flop 715 so that QA is driven positive state.

When both QA and QB are in a positive state, the reset signals rsta and rstb are driven to a low state, and both QA and QB are cleared.

Since QA is not asserted, no pulse appears at Aout.

Figure 10:
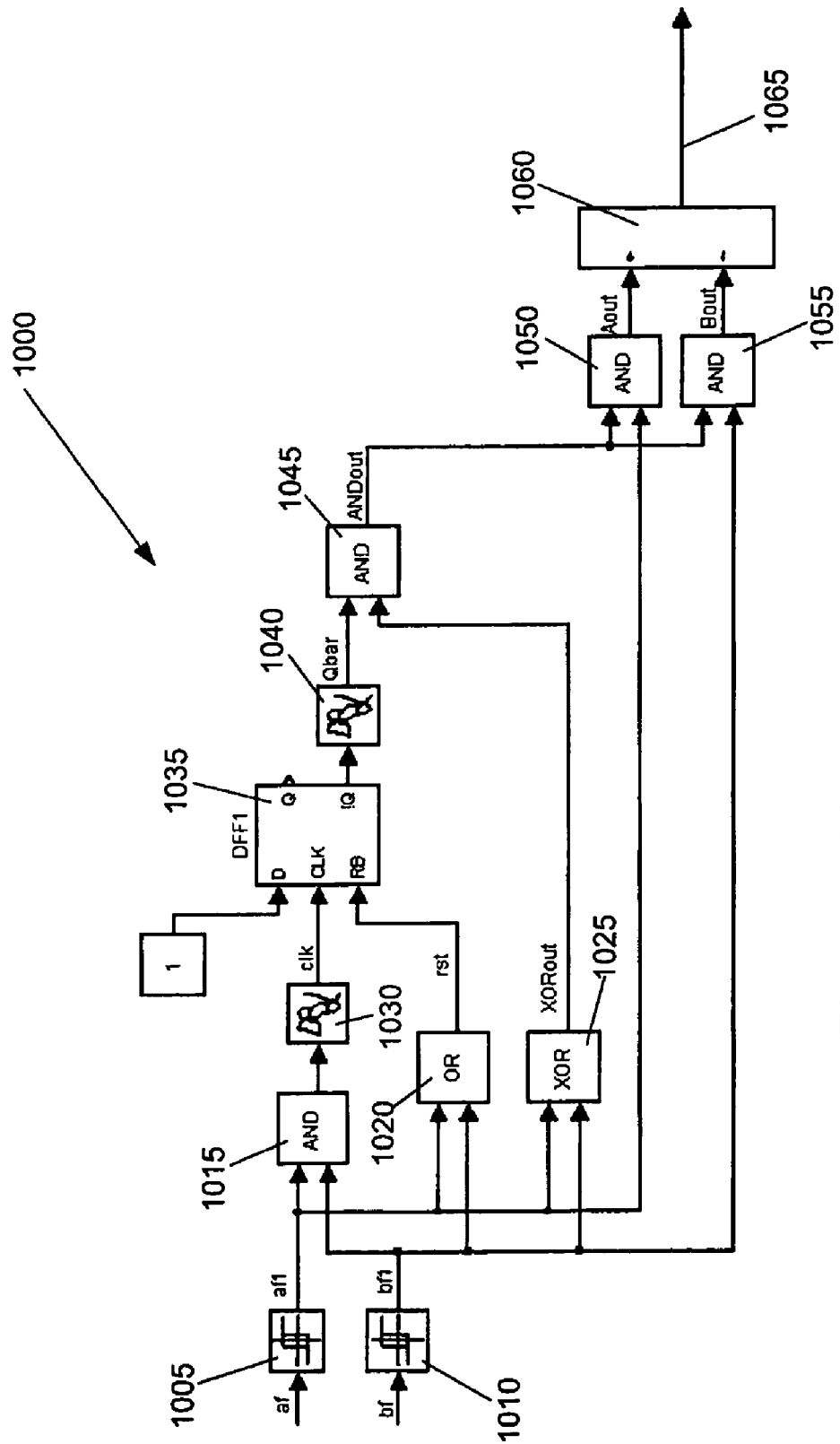
FIG. 10 is a block diagram of a second embodiment of a phase detector.

FIG. 10 shows a first embodiment of a phase detector 1000 that substantially eliminates lost pulses caused by aberrations at the falling edge of the input signals to the phase detector logic. In FIG. 10, signals af and bf are in communication with the inputs of slicers 1005 and 1010 to generate signals afl and bfl. Signals afl and bfl are in communication with the inputs of AND gate 1015, OR gate 1020, and XOR gate 1025. The output of AND gate 1015 is in communication with delay line 1030 that, in turn, provides a clock signal clk to a flip-flop 1035. The output of OR gate 1020 provides a reset signal rst that is in communication with the reset input of flip-flop 1035. The inverted output of flip-flop 1035 is in communication with a delay line 1040 to generate signal Qbar. Signal Qbar, in turn, is in communication with an input of AND gate 1045. The output signal XORout of XOR gate is in communication with another input of AND gate 1045, the output signal of which is designated ANDout. Signal ANDout is in communication with an input of AND gate 1050 as well as AND gate 1055. Signal afl is provided to another input of AND gate 1050 to facilitate generation of signal Aout. Similarly, signal bfl is in communication with another input of AND gate 1055 to facilitate generation of signal Bout. Signals Aout and Bout are in communication with the inputs of a summation circuit 1060 to generate a difference signal at line 1065.

Figure 11:
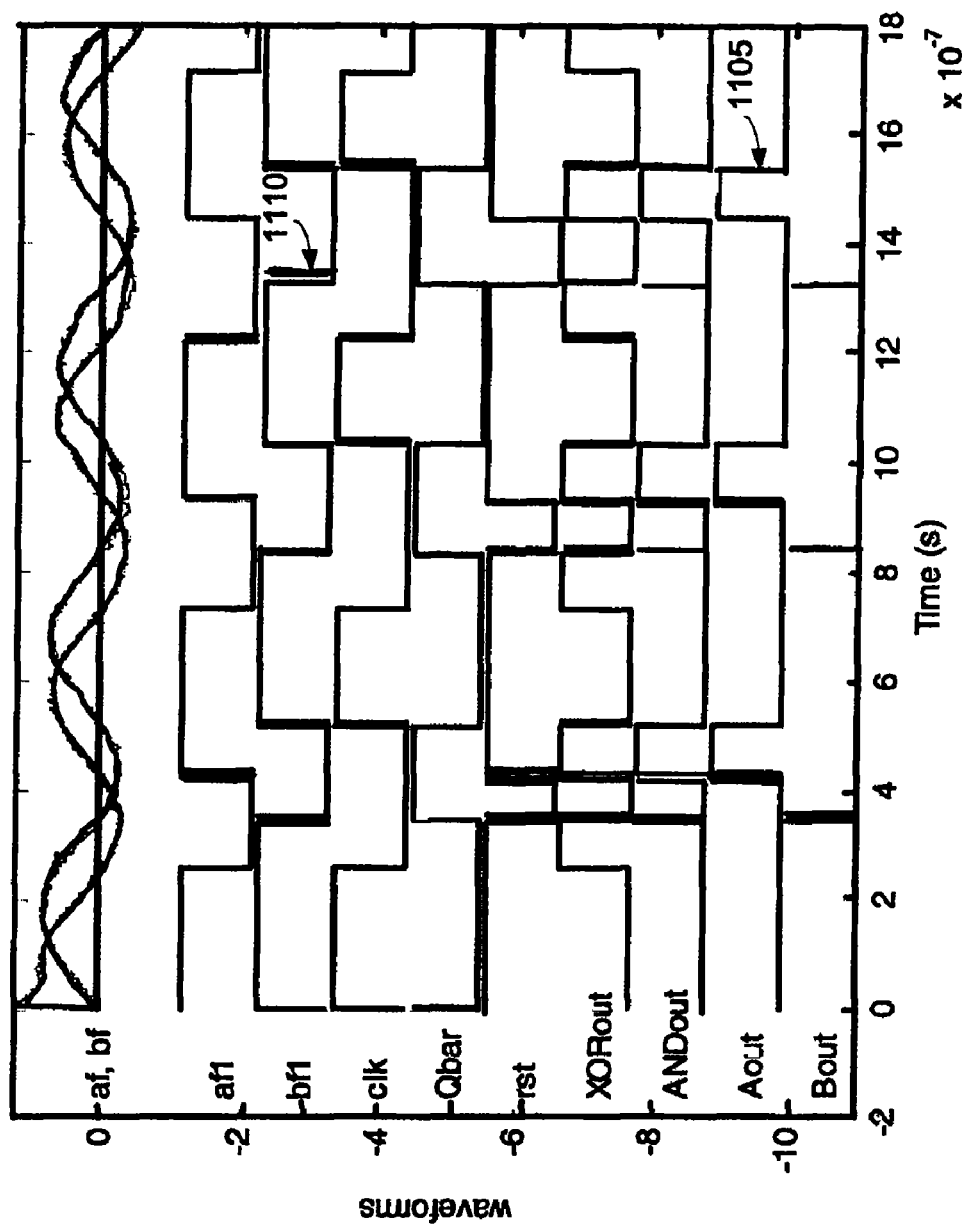
FIG. 11 is a timing diagram showing the signals used in the phase detector of FIG. 10.

The operation of phase detector 1000 may be understood with reference to the timing diagram shown in FIG. 11. The operation of this logic can be summarized as follows:

The exclusive OR of the equalized and sliced signals afl and bfl, denoted XORout has the desired pulse width corresponding to the phase difference between the rising edge of signal afl and the rising edge of signal bfl. However, an additional pulse having a width corresponding to the phase difference between the falling edge of afl and bfl is also present. This additional pulse is unwanted.

The flip-flop 1035 is used to generate a window that may be used to gate the XORout signal between the rising edge of afl and the rising edge of bfl. The window may be generated with a single flip-flop.

As shown in FIG. 11, the desired positive going pulse 1105 in Aout from 1.445 μs to 1.545 μs is present despite the presence of the aberration 1110 at the falling edge of signal bfl that occurs during the immediately preceding phase detection cycle.

Figure 12:
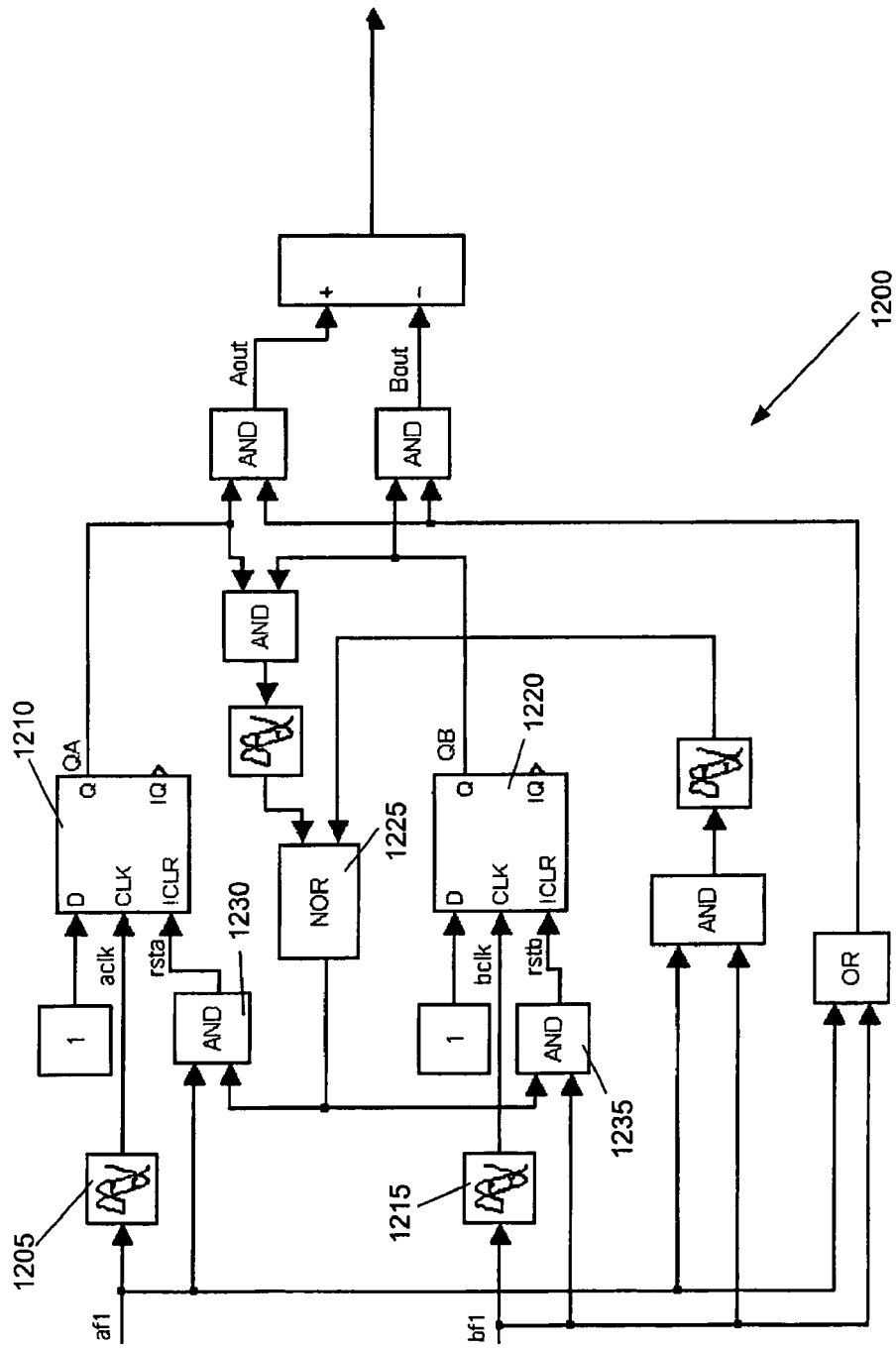
FIG. 12 is a block diagram of a third embodiment of a phase detector.

FIG. 12 shows a second embodiment of a phase detector 1200 that substantially eliminates lost pulses caused by aberrations at the falling edge of the input signals to the phase detector logic. Phase detector 1200 operates to clear signal QB after it is triggered by an aberration at the falling edge of signal bfl.

Phase detector 1200 is similar to phase detector 700 with several exceptions. Signal afl is in communication with an input of a delay line 1205 to generate a clock signal aclk for flip-flop 1210. Similarly, signal bfl is in communication with an input of a delay line 1215 to generate a clock signal bclk for flip-flop 1220. The output of NOR gate 1225 is in communication with an input of AND gate 1230. Signal afl is in communication with another input of AND gate 1230. The output signal rsta of AND gate 1230 is in communication the reset input of flip-flop 1210. The output of NOR gate 1225 is also in communication with an input of AND gate 1235. Signal bfl is in communication with another input of AND gate 1235. The output signal rstb of AND gate 1235 is in communication the reset input of flip-flop 1220.

The operation of phase detector 1200 may be summarized as follows:

From analysis of phase detector 700, the pulse omission is exacerbated when signal QB stays high for a long time. Therefore, it is desirable to clear signal QB after it is triggered by an aberration.

Signal QB may be cleared whenever bfl is low. It is assumed that aberrations have a short duration. As such, signal QB is cleared substantially immediately after the occurrence of the aberration. Useful pulses in signal bfl are long, so when signal QB is triggered by a useful pulse, signal bfl stays high and QB is not cleared.

This analysis also applies for signal QA and leads to the design shown in FIG. 12. Delay line 1205 for signal afl is to assure that signal rsta is steadily high at a rising edge of signal aclk.

Figure 13:
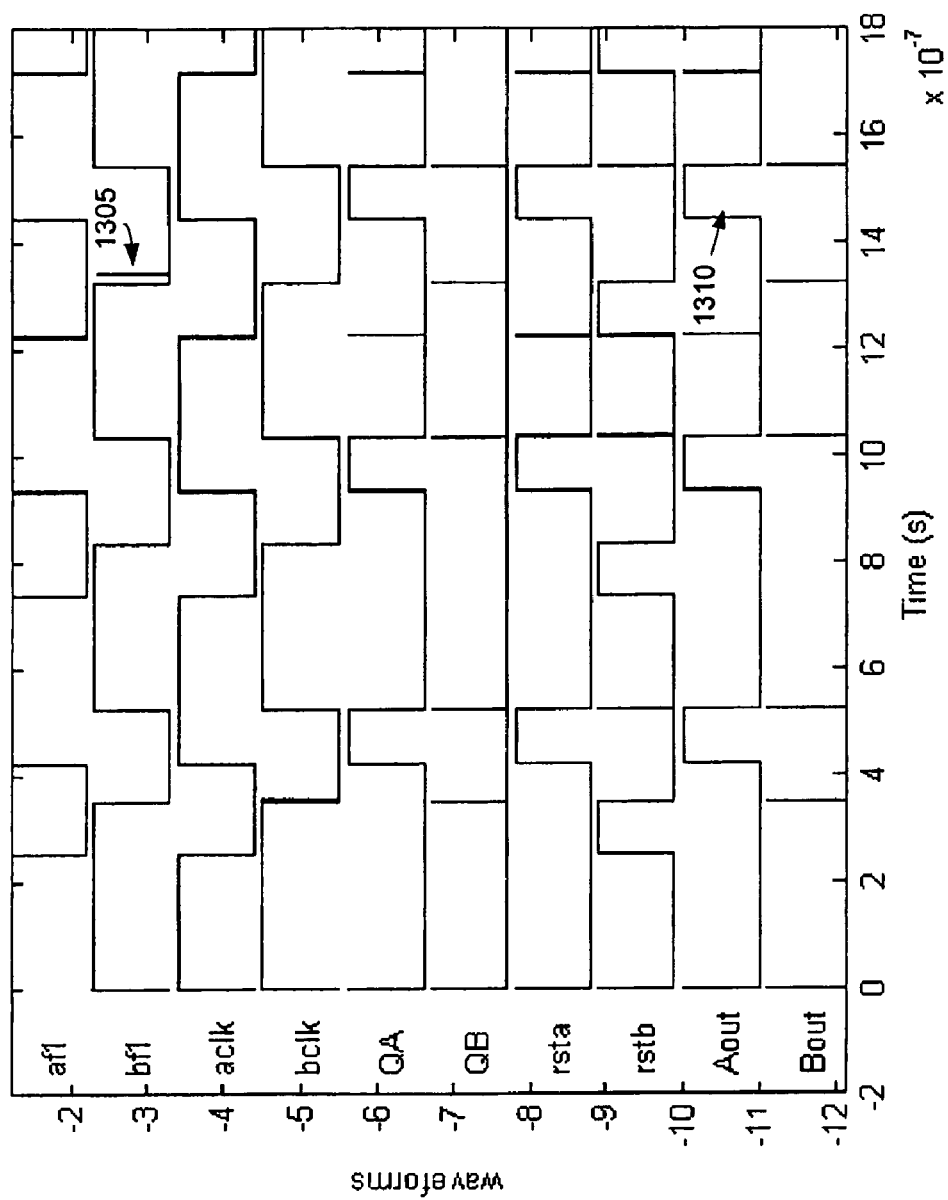
FIG. 13 is a timing diagram showing the signals used in the phase detector of FIG. 12.

Waveforms of the same input stimuli shown in FIG. 9 are shown in FIG. 13. An aberration 1305 occurs proximate a falling edge of signal bfl. Nevertheless, the desired positive going pulse 1310 in Aout from 1.445 μs to 1.545 μs is present.

Figure 14:
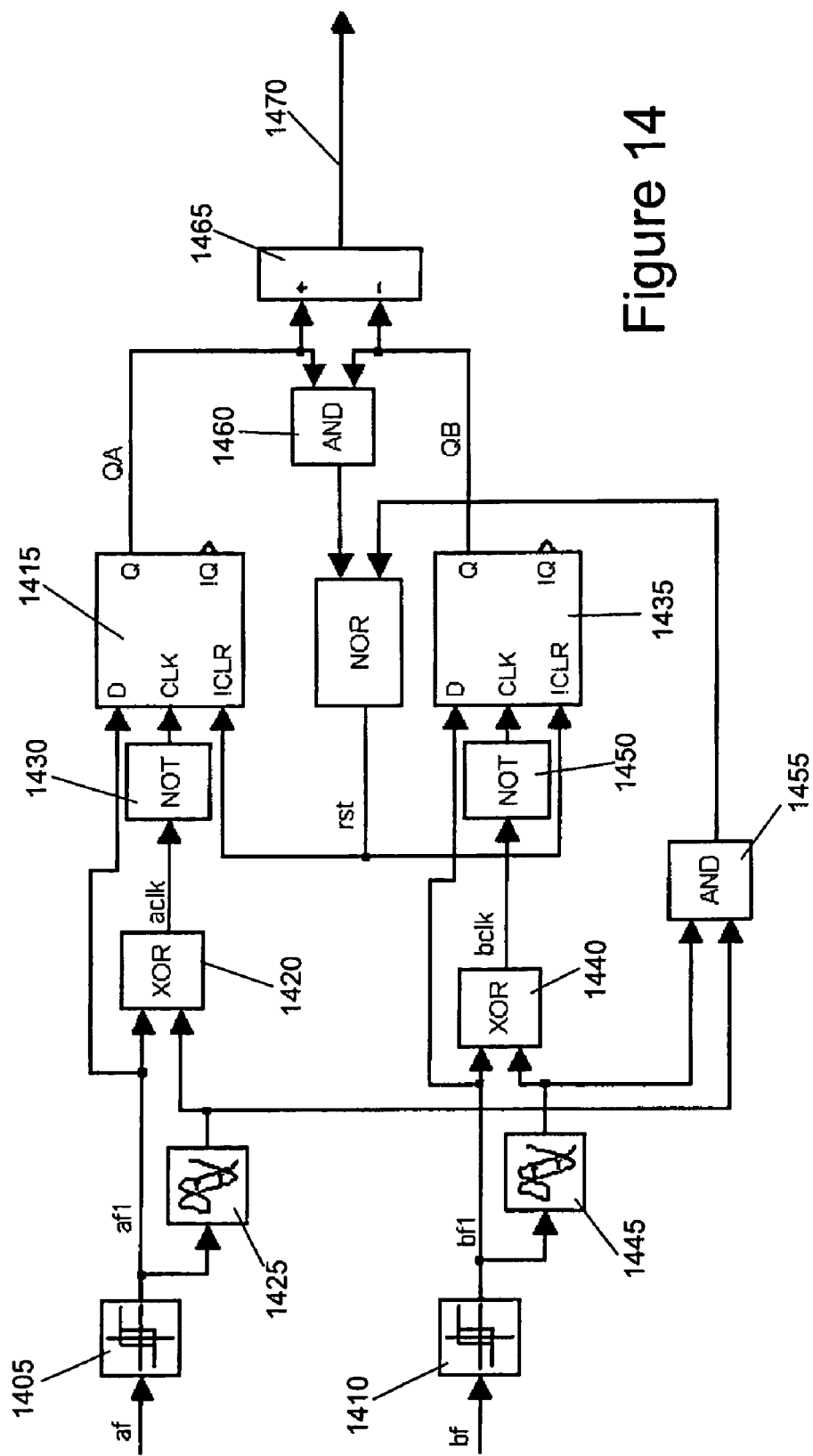
FIG. 14 is a block diagram of a fourth embodiment of a phase detector.

FIG. 14 shows a third embodiment of a phase detector 140 that substantially eliminates lost pulses caused by aberrations at the falling edge of the input signals to the phase detector logic. In FIG. 14, signal of is in communication with slicer 1405 to generate signal afl while signal bf is in communication with slicer 1410 to generate signal bfl. Signal afl is in communication with the data input of flip-flop 1415 and an input of XOR gate 1420. Signal afl is also in communication with another input of XOR gate 1420 through delay line 1425. Together, signal afl and the delayed version of signal afl are used to generate a signal aclk at the output of XOR gate 1420. Signal aclk is inverted by NOT gate 1430 and used to generate the clock signal to flip-flop 1415.

Signal bfl is in communication with the data input of flip-flop 1435 and an input of XOR gate 1440. Signal bfl is also in communication with another input of XOR gate 1440 through delay line 1445. Together, signal bfl and the delayed version of signal bfl are used to generate a signal bclk at the output of XOR gate 1440. Signal bclk is inverted by NOT gate 1450 and used to generate the clock signal to flip-flop 1415.

Elimination of the "memory" effect in phase detector 1400 is facilitated by the communications between AND Gates 1455 and 1460, and NOR gate 1465. The output signals QA and QB of flip-flops 1415 and 1435, respectively, are in communication with the inputs of a summing circuit 1465 that provides a difference signal at line 1470.

Figure 15:
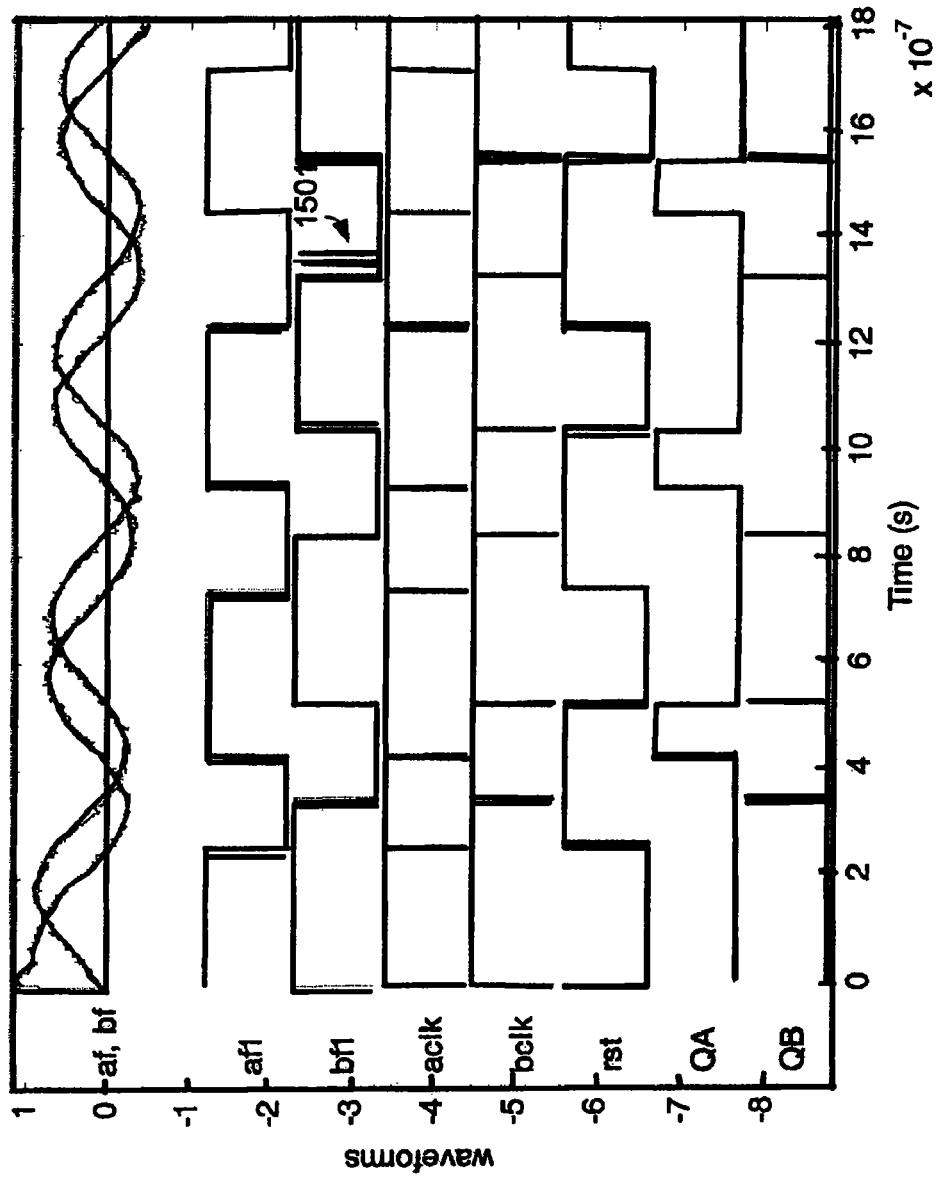
FIG. 15 is a timing diagram showing signals used in the phase detector of FIG. 14.
Figure 16:
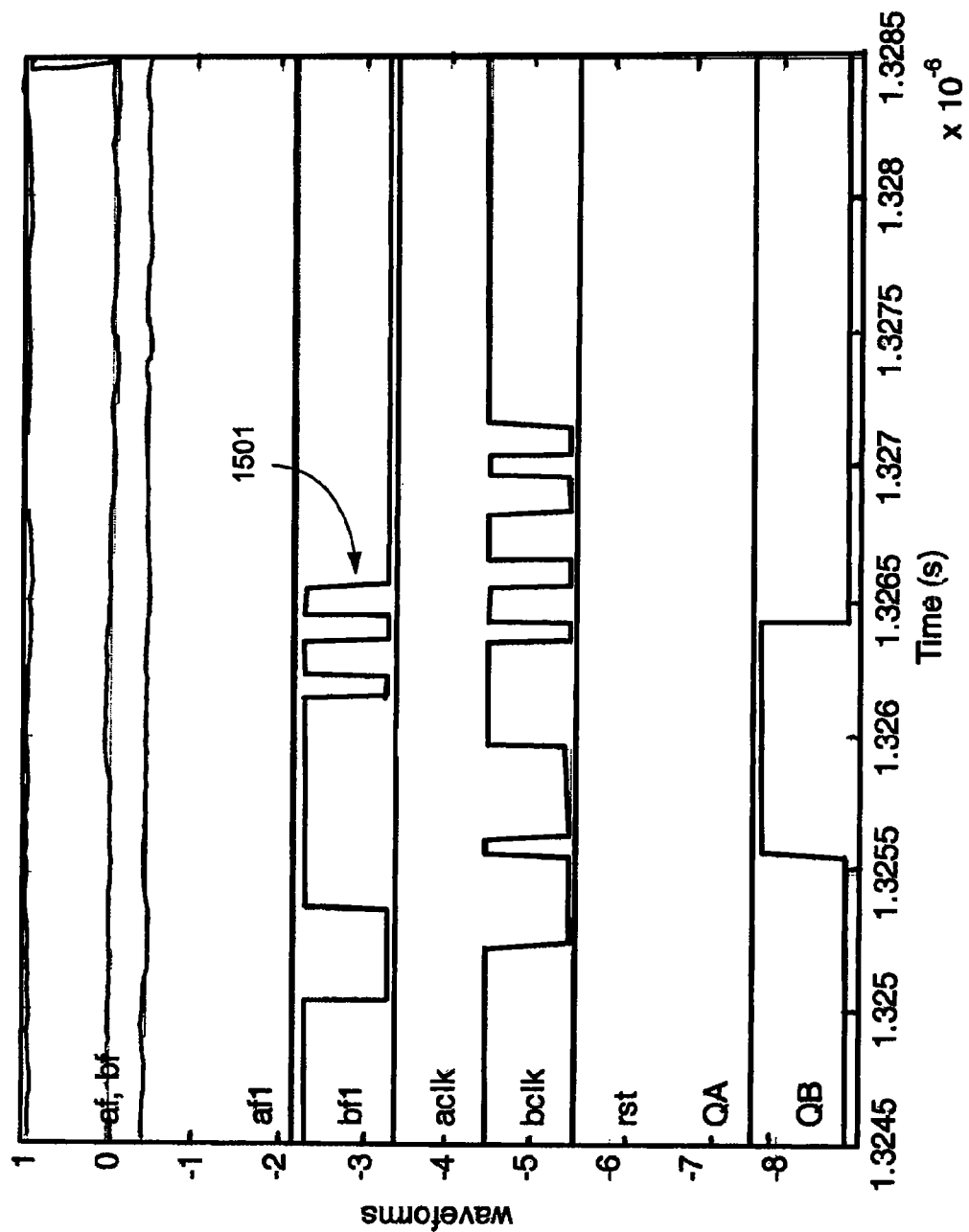
FIG. 16 is a further timing diagram showing signals used in the phase detector of FIG. 14.

The operation of phase detector 1400 may be described with reference to the timing diagram of FIGS. 15 and 16 as follows:

Signal bclk is generated as the exclusive OR of signal bfl and the delayed version of signal bfl. FIG. 15 shows the waveforms of the same input stimuli as FIG. 8 having aberrations 1501 proximate a falling edge of signal bfl. FIG. 16 is an exploded version of FIG. 15. In FIGS. 15 and 16, signal bclk has rising edges after the aberrations 1501.

At the last rising edge of signal bclk, signal bfl is already stable at a low level. Consequently, signal QB is triggered by the last rising edge of bclk to ensure that signal QB only has a short duration. Signal QB is therefore in an asserted state for a short time and does not inhibit generation of signal QA during the subsequent phase detection cycle.

The same analysis also applies to signal afl.

Figure 17:
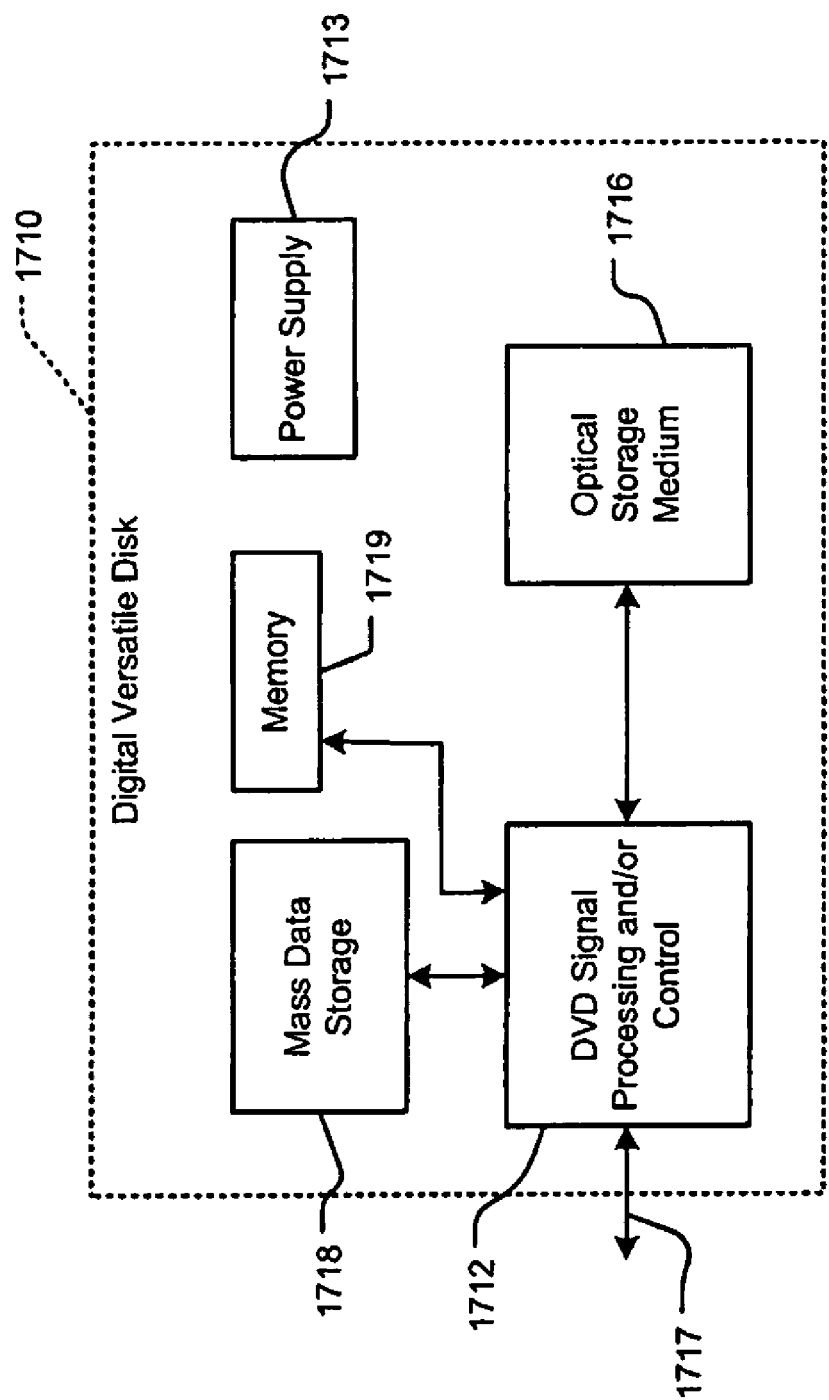
FIG. 17 is a functional block diagram of a digital versatile disk (DVD)

Referring now to FIGS. 17 through 21, various exemplary uses of the present invention are shown. As shown in FIG. 17, the present invention can be implemented in a digital versatile disk drive 1710. More particularly, the optical storage medium 1716 may include a differential phase detector and/or phase detector circuit such as those described above. The output of the storage medium 1716 may be in communication with the input of a DVD signal processing and/or control circuit 1712 having a processed output signal at line 1717. DVD signal processing and/or control circuit 1712 may also be in communication with mass data storage 1718 and memory 1719. The digital versatile disk system 1710 may be powered by power supply 1713. The signal processing and/or control circuit 1712 and/or other circuits (not shown) in the DVD 1710 may process data, perform coding and/or encryption, perform calculations, and/or format data that is read from and/or data written to the optical storage medium 1716. In some implementations, the signal processing and/or control circuit 1712 and/or other circuits (not shown) in the DVD 1710 can also perform other functions such as encoding and/or decoding and/or any other signal processing functions associated with a DVD drive.

The DVD drive 1710 may communicate with an output device (not shown) such as a computer, television or other device via one or more wired or wireless communication links 1717. The DVD 1710 may communicate with mass data storage 1718 that stores data in a nonvolatile manner. The mass data storage 1718 may include a hard disk drive (HDD). The HDD may be a mini HDD that includes one or more platters having a diameter that is smaller than approximately 1.8". The DVD 1710 may be connected to memory 1719 such as RAM, ROM, low latency nonvolatile memory such as flash memory and/or other suitable electronic data storage.

Figure 18:
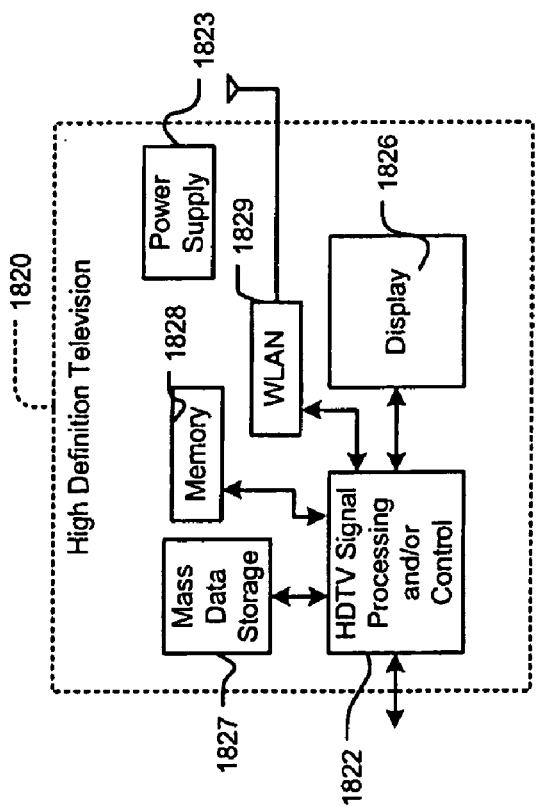
FIG. 18 is a functional block diagram of a high definition television.

Referring now to FIG. 18, the present invention can be implemented in a high definition television (HDTV) 1820. The differential phase detectors and/or phase detectors described above may be used in an optical storage system that is used to implement the mass data storage 1827. The HDTV 1820 receives HDTV input signals in either a wired or wireless format and generates HDTV output signals for a display 1826. In some implementations, signal processing circuit and/or control circuit 1822 and/or other circuits (not shown) of the HDTV 1820 may process data, perform coding and/or encryption, perform calculations, format data and/or perform any other type of HDTV processing that may be required.

The HDTV 1820 may communicate with mass data storage 1827 that stores data in a nonvolatile manner, such as an optical storage device. At least one DVD may have the configuration shown in FIG. 17. The HDTV 1820 may be connected to memory 1828 such as RAM, ROM, low latency nonvolatile memory such as flash memory and/or other suitable electronic data storage. The HDTV 1820 also may support connections with a WLAN via a WLAN network interface 1829 and be powered by power supply 1823.

Figure 19:
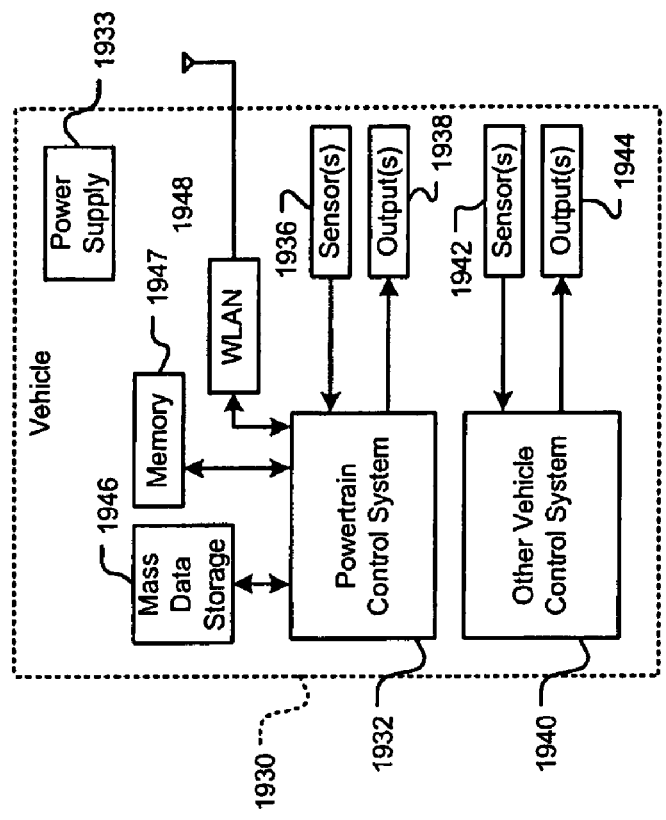
FIG. 19 is a functional block diagram of a vehicle control system.

Referring now to FIG. 19, the present invention may be implemented in a mass data storage 1946 of a vehicle control system 1930. Control system 1930 may include a powertrain control system 1932 in communication with the mass data storage 1946, memory 1947, and a WLAN interface 1948. Powertrain control system 1932 may interface with the vehicle through sensors 1936 and outputs 1938. In some implementations, the control system 1932 receives inputs from sensors 1936 such as temperature sensors, pressure sensors, rotational sensors, airflow sensors and/or any other suitable sensors and/or generate output control signals 1938 such as engine operating parameters, transmission operating parameters, and/or other control signals. Control system 1930 may also include other vehicle control systems 1940 that interface with the vehicle through sensors 1942 and outputs 1944. In some implementations, the control system 1940 may be part of an anti-lock braking system (ABS), a navigation system, a telematics system, a vehicle telematics system, a lane departure system, an adaptive cruise control system, a vehicle entertainment system such as a stereo, DVD, compact disk and the like. Power for the control system 1930 may be provided by power supply 1933. Still other implementations are contemplated.

Figure 20:
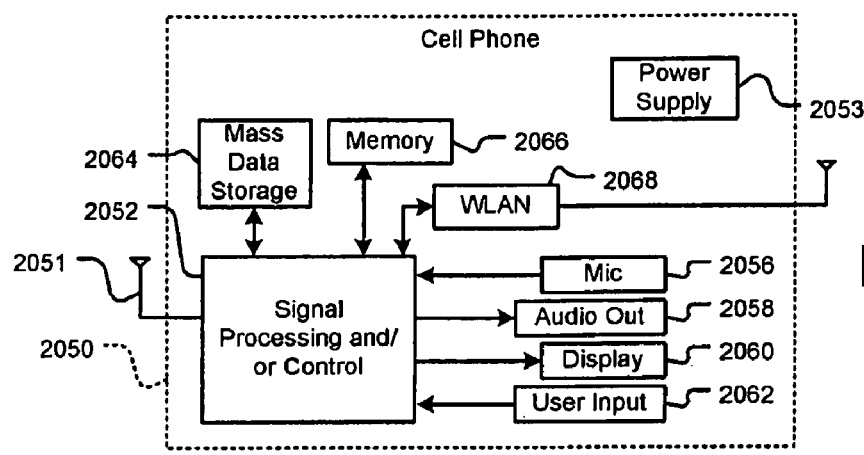
FIG. 20 is a functional block diagram of a cellular phone.

Referring now to FIG. 20, the present invention can be implemented in the mass data storage 2064 of a cellular phone 2050 that may include a cellular antenna 2051. In some implementations, the cellular phone 2050 includes a microphone 2056, an audio output 2058 such as a speaker and/or audio output jack, a display 2060 and/or an input device 2062 such as a keypad, pointing device, voice actuation and/or other input device. The signal processing and/or control circuits 2052 and/or other circuits (not shown) in the cellular phone 2050 may process data, perform coding and/or encryption, perform calculations, format data and/or perform other cellular phone functions.

The cellular phone 2050 may communicate with mass data storage 464 that stores data in a nonvolatile manner, such as in optical storage device. The cellular phone 2050 may be connected to memory 2066 such as RAM, ROM, low latency nonvolatile memory such as flash memory and/or other suitable electronic data storage. The cellular phone 2050 also may support connections with a WLAN via a WLAN network interface 2068. Power to the cellular phone 2050 may be provided by power supply 2053.

Figure 21:
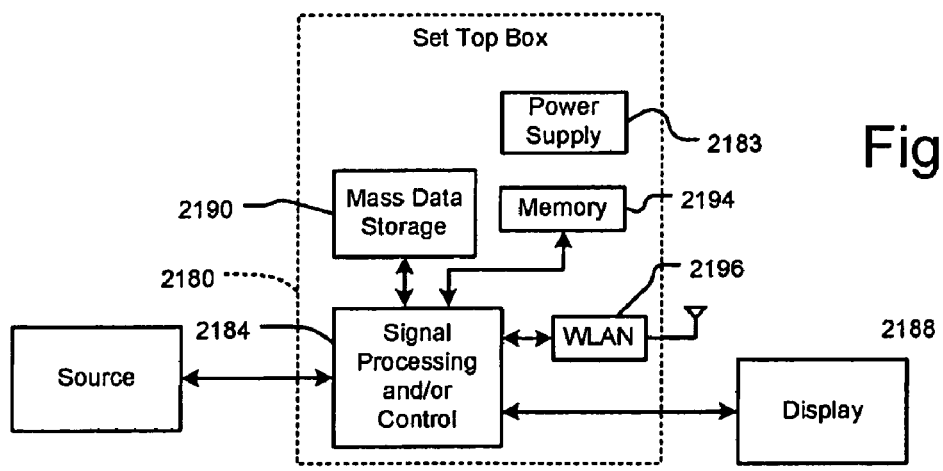
FIG. 21 is a functional block diagram of a set top box.

Referring now to FIG. 21, the present invention can be implemented in the mass data storage 2190 of a set top box 2180. The set top box 2180 receives signals from a source such as a broadband source and outputs standard and/or high definition audio/video signals suitable for a display 2188 such as a television and/or monitor and/or other video and/or audio output devices. The signal processing and/or control circuits 2184 and/or other circuits (not shown) of the set top box 2180 may process data, perform coding and/or encryption, perform calculations, format data and/or perform any other set top box function.

The set top box 2180 may communicate with mass data storage to 190 that stores data in a nonvolatile manner. The mass data storage to 190 may include optical storage devices that include differential phase detectors and/or phase detectors such as those described above. The set top box 1480 may be connected to memory 1494 such as RAM, ROM, low latency nonvolatile memory such as flash memory and/or other suitable electronic data storage. The set top box 1480 also may support connections with a WLAN via a WLAN network interface 1496. Power for the set top box 2180 may be provided by power supply 2183.

Figure 22:
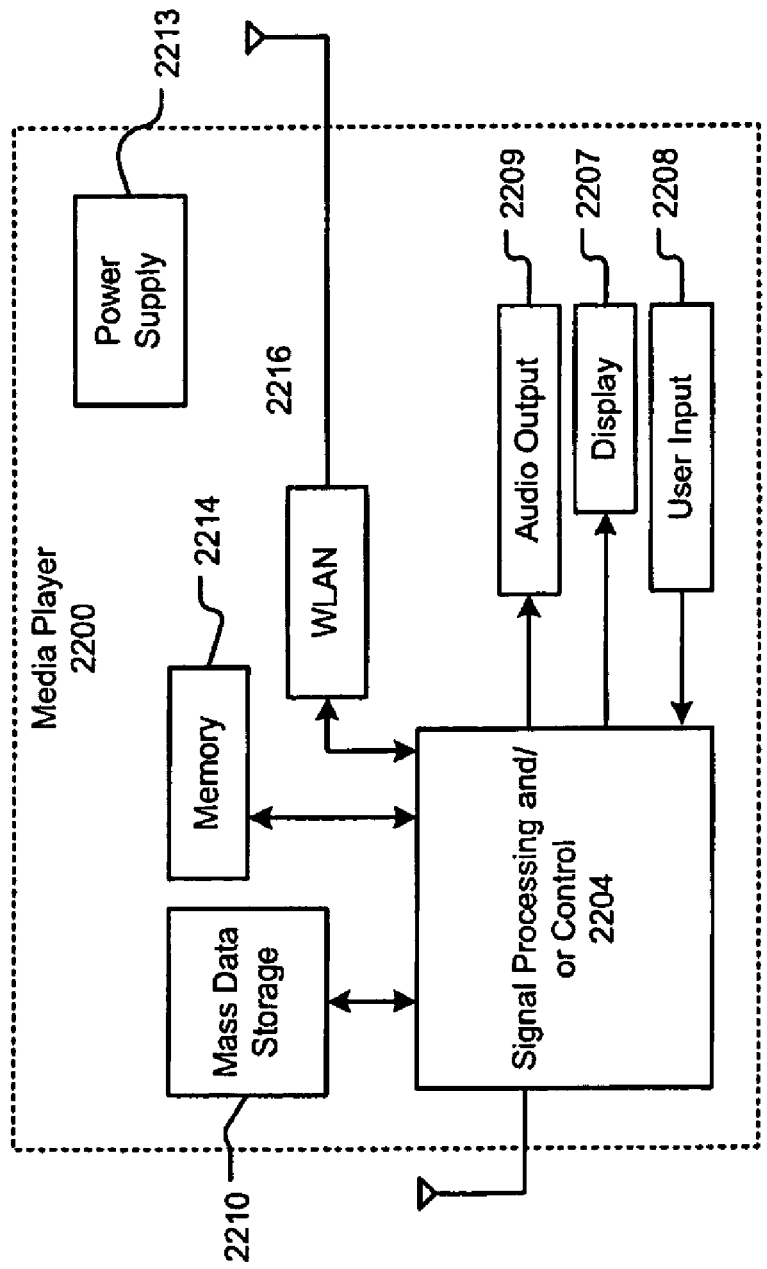
FIG. 22 is a functional block diagram of a media player.

Referring now to FIG. 22, the present invention can be implemented in a mass data storage 2210 of a media player 2200. In some implementations, the media player 2200 includes a display 2207 and/or a user input 2208 such as a keypad, touchpad and the like. In some implementations, the media player 2200 may employ a graphical user interface (GUI) that employs menus, drop down menus, icons and/or a point-and-click interface via the display 2207 and/or user input 2208. The media player 2200 further includes an audio output 2209 such as a speaker and/or audio output jack. The signal processing and/or control circuits 2204 and/or other circuits (not shown) of the media player 2200 may process data, perform coding and/or encryption, perform calculations, format data and/or perform any other media player function.

The media player 2200 may communicate with mass data storage 2210 that stores data such as compressed audio and/or video content in a nonvolatile manner. In some implementations, the compressed audio files include files that are compliant with MP3 format or other suitable compressed audio and/or video formats. The mass data storage 2210 may include optical storage devices that include differential phase detectors and/or phase detection circuits of the type described above. The media player 2200 also may support connections with a WLAN via a WLAN network interface 2216. Still other implementations in addition to those described above are contemplated.

It is intended that the foregoing detailed description be understood as an illustration of selected forms that the invention can take and not as a definition of the invention. It is only the following claims, including all equivalents, that are intended to define the scope of this invention.

What is claimed is:

1. A phase detector comprising:
a first slicing circuit generating a first digital signal corresponding to a logic state of a first generally continuous signal;
a second slicing circuit generating a second digital signal corresponding to a logical state of a second generally continuous signal;
phase detector logic comparing a triggering edge of the first digital signal and a triggering edge of the second digital signal to generate a phase difference signal having a pulse width corresponding to a phase difference between the triggering edges of the first and second digital signals; and
aberration compensation circuitry in communication with the phase detector logic, wherein the aberration compensation circuitry is adapted to ensure generation of the phase difference signal by the phase detector logic in the presence of signal aberrations occurring at the triggering edges of the first and second digital signals.

2. The phase detector of claim 1, wherein
the phase detector logic comprises an exclusive OR logic circuit having first and second inputs in communication with the first and second digital signals, wherein the exclusive OR logic circuit applies exclusive OR (XOR) logic to signals that are provided to its first and second inputs to generate an XOR output signal; and
wherein the aberration compensation circuitry comprises a window generation circuit adapted to apply a window to gate the XOR output signal between the triggering edges of the first and second digital signals, wherein the phase detector logic uses a difference in time between occurrences of the triggering edges to generate the phase difference signal.

3. The phase detector of claim 2, wherein the triggering edge of the first digital signal and the triggering edge of the second digital signal are rising edges.

4. The phase detector of claim 2, wherein the window generation circuit comprises:
a clock edge triggered storage device, wherein the clock edge triggered device includes a clock input, a reset input, a data bit input, and a clocked bit output;
a first AND logic circuit having first and second inputs in communication with the first and second digital signals, wherein the first AND logic circuit generates an output signal corresponding to a logical AND of signals that are provided to its first and second inputs, wherein the first AND output signal is in communication with the clock input;
an OR logic circuit having first and second inputs in communication with the first and second digital signals, wherein the OR logic circuit generates an output signal corresponding to a logical OR of signals that are provided to its first and second inputs to generate an OR logic output signal, wherein the OR logic output signal is in communication with the reset input; and
a second AND logic circuit having first and second inputs in communication with the XOR output signal and the clocked bit output, wherein the second AND logic circuit generates an output signal corresponding to a logical AND of signals that are provided to its first and second inputs.

5. The phase detector of claim 4, further comprising:
a third AND logic circuit having first and second inputs in communication with the first digital signal and the output signal of the second AND logic circuit, wherein the third AND logic circuit generates an output signal corresponding to a logical AND of signals that are provided to its first and second inputs; and
a fourth AND logic circuit having first and second inputs in communication with the second digital signal and the output signal of the second AND logic circuit, wherein the fourth AND logic circuit generates an output signal corresponding to a logical AND of signals that are provided to its first and second inputs.

6. The phase detector of claim 4, further comprising:
a first delay line having an input in communication with the output of the first AND logic circuit and an output in communication with the clock input; and
a second delay line having an input in communication with the clocked bit output and an output in communication with an input of the second AND logic circuit.

7. The phase detector of claim 1, wherein the phase detector logic comprises:
a first clock edge triggered storage device, wherein the first clock edge triggered device includes a clock input, a reset input, a data bit input, and a clocked bit output, wherein the clock input of the first clock edge triggered storage device is in communication with the first digital signal;
a second clock edge triggered storage device, wherein the second clock edge triggered device includes a clock input, a reset input, a data bit input, and a clocked bit output, wherein the clock input of the second clock edge triggered storage device is in communication with the second digital signal;
feedback circuitry in communication with the clocked bit output of the first clock edge triggered storage device and the clocked bit output of the second clock edge triggered storage device, wherein the feedback circuitry is adapted to generate a logical feedback signal for use in resetting the first and second clock edge triggered storage devices.

8. The phase detector of claim 7, wherein the aberration compensation circuitry comprises:
a first AND logic circuit having first and second inputs in communication with the first digital signal and the logical feedback signal, wherein the first AND logic circuit generates an output signal corresponding to a logical AND of signals that are provided to its first and second inputs, wherein the output signal of the first AND logic circuit is in communication with the reset input of the first clock edge triggered storage device;
a second AND logic circuit having first and second inputs in communication with the second digital signal and the logical feedback signal, wherein the second AND logic circuit generates an output signal corresponding to a logical AND of signals that are provided to its first and second inputs, wherein the output signal of the second AND logic circuit is in communication with the reset input of the second clock edge triggered storage device.

9. The phase detector of claim 7, further comprising:
a first delay line having an input in communication with the first digital signal and an output in communication with the clock input of the first clock edge triggered storage device; and
a second delay line having an input in communication with the second digital signal and an output in communication with the clock input of the second clock edge triggered storage device.

10. The phase detector of claim 7, wherein the feedback circuitry comprises:
a first AND logic circuit having first and second inputs in communication with the clocked bit output of the first clock edge triggered storage device and the second clock edge triggered storage device, wherein the first AND logic circuit generates an output signal corresponding to a logical AND of the signals that are provided to its first and second inputs;
a second AND logic circuit having first and second inputs in communication with the first and second digital signals, wherein the second AND logic circuit generates an output signal corresponding to a logical AND of the signals that are provided to its first and second inputs;
a NOR logic circuit having first and second inputs and generating an output signal corresponding to a logical NOR of the signals that are provided to its first and second inputs;
a first delay line having an input in communication with the output signal of the first AND logic circuit and an output in communication with the first input of the NOR logic circuit; and
a second delay line having an input in communication with the output signal of the second AND logic circuit and an output in communication with the second input of the NOR logic circuit.

11. A phase detector comprising:
first slicing circuit means for generating a first digital signal corresponding to a logic state of a first generally continuous signal;
second slicing means for generating a second digital signal corresponding to a logical state of a second generally continuous signal;
phase detector means for generating a phase difference signal having a pulse width corresponding to a phase difference between a triggering edge of the first digital signal and a triggering edge of the second digital signal; and
aberration compensation means for ensuring generation of the phase difference signal by the phase detector means in the presence of signal aberrations occurring at the triggering edges of the first and second digital signals.

12. The phase detector of claim 11, wherein
the phase detector means comprises an exclusive OR logic circuit having first and second inputs in communication with the first and second digital signals, wherein the exclusive OR logic circuit applies exclusive OR (XOR) logic to signals provided to its first and second inputs to generate an XOR output signal; and
wherein the aberration compensation means comprises a window generator means for applying a gate window to the XOR output signal between the triggering edges of the first and second digital signals, wherein the phase detector means uses a difference in time between occurrence of the triggering edges of the first and second digital signals to generate the phase difference signal.

13. The phase detector of claim 12, wherein the triggering edge of the first digital signal and the triggering edge of the second digital signal are rising edges.

14. The phase detector of claim 12, wherein the window generation means comprises:
clock edge triggered means for generating a clocked bit output based on a clock input signal, a reset input signal, and a data bit input signal;
first AND logic means for generating the clock input signal to the clock edge triggered means, wherein the first AND logic means generates the clock input signal as a logical AND of the first and second digital signals;
OR logic means for generating the reset input signal to the clock edge triggered means, wherein the reset input signal corresponds to a logical OR of the first and second digital signals; and
second AND logic means for generating an output signal from the XOR output signal and the clocked bit output.

15. The phase detector of claim 14, further comprising:
first delay line means for generating a delayed version of the clock input signal, wherein the clock input signal is in communication with the clock input signal of the clock edge triggered means; and
second delay line means for generating a delayed version of the clocked bit output signal of the clock edge triggered means to an input of the second AND logic means.

16. The phase detector of claim 11, wherein the phase detector means comprises:
first clock edge triggered for generating a clocked bit output signal from a clock input signal, a reset input signal, and a data bit input signal, wherein the clock input signal of the first clock edge triggered means is in communication with the first digital signal;
second clock edge triggered means for generating a further clocked bit output signal from the clock input signal, the reset input signal, and a data bit input signal, wherein the clock input signal of the second clock edge triggered storage device is in communication with the second digital signal;
feedback means for generating a logical feedback signal for use in resetting the first clock edge triggered means and the second clock edge triggered means, wherein the feedback means is in communication with the clocked bit output signal of the first clock edge triggered means and the clocked bit output signal of the second clock edge triggered means.

17. The phase detector of claim 16, wherein the aberration compensation means comprises:
first AND logic means for generating the reset signal to the first clock edge triggered means from the first digital signal and the logical feedback signal; and
second AND logic means for generating the reset signal to the second clock edge triggered means from the second digital signal and the logical feedback signal.

18. The phase detector of claim 16, further comprising:
first delay line means for providing an output signal corresponding to a delayed version of the first digital signal, wherein the output signal of the first delay line means is in communication with the clock input of the first clock edge triggered means; and
a second delay line means for providing an output signal corresponding to a delayed version of the second digital signal, wherein the output signal of the second delay line means is in communication with the clock input of the second clock edge triggered storage device.

19. A method for detecting a phase difference between first and second generally continuous signals, the method comprising:
generating a first digital signal corresponding to a logic state of the first generally continuous signal;
generating a second digital signal corresponding to a logical state of the second generally continuous signal;
applying an aberration compensation technique to generate a phase difference signal having a pulse width corresponding to a phase difference between a phase of the first generally continuous signal and a phase of the second generally continuous signal, wherein the aberration compensation technique ensures generation of the phase difference signal in the presence of signal aberrations occurring at a triggering edge of the first and second digital signals.

20. The method of claim 19, wherein the aberration compensation technique comprises:

generating an exclusive OR logic signal from the first and second digital signals; and applying a gate window to the exclusive OR logic signal pursuant to generating the phase difference signal.

21. The method of claim 19, wherein the aberration compensation technique comprises:

generating a first clocked bit from the first digital signal;

generating a second clocked bit from the second digital signal; and generating a logical feedback signal from the first and second clocked bit outputs to reset the first and second clocked bit signals.

* * * * *